(12) United States Patent
Chen et al.

(10) Patent No.: US 10,044,585 B2
(45) Date of Patent: *Aug. 7, 2018

(54) VIRTUAL PRIVATE NETWORK DEAD PEER DETECTION

(71) Applicant: SonicWALL US Holdings Inc., Santa Clara, CA (US)

(72) Inventors: Zhong Chen, Fremont, CA (US); Aravind Thangavelu, Dublin, CA (US); Dong Xiang, Shanghai (CN); Yanjun Yang, Shanghai (CN)

(73) Assignee: SonicWALL Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,458

(22) Filed: Jun. 26, 2017

(65) Prior Publication Data

US 2017/0295079 A1 Oct. 12, 2017

Related U.S. Application Data

(63) Continuation of application No. 15/077,891, filed on Mar. 22, 2016, now Pat. No. 9,736,048, which is a
(Continued)

(51) Int. Cl.
*G06F 15/16* (2006.01)
*H04L 12/26* (2006.01)
*H04L 29/14* (2006.01)
*H04L 29/08* (2006.01)
*H04L 29/06* (2006.01)

(52) U.S. Cl.
CPC ........ *H04L 43/0847* (2013.01); *H04L 43/065* (2013.01); *H04L 67/142* (2013.01); *H04L 69/40* (2013.01); *H04L 63/0272* (2013.01); *H04L 63/164* (2013.01); *H04L 67/2809* (2013.01)

(58) Field of Classification Search
CPC ......... H04L 63/08; H04L 63/10; H04L 63/20; H04L 29/06; H04L 63/0428; H04L 43/065; H04L 43/0847; H04L 67/142; H04L 69/40
See application file for complete search history.

(56) References Cited

U.S. PATENT DOCUMENTS 6,668,282 B1 12/2003 Booth et al.
6,976,071 B1 12/2005 Donzis et al.
(Continued)

OTHER PUBLICATIONS

Huang et al.; "A traffic-Based Method of Detecting Dead Internet Key Exchange (IKE) Peers" published in Feb. 2004, pp. 1-13.
(Continued)

*Primary Examiner* — Baotran N To
(74) *Attorney, Agent, or Firm* — Polsinelli LLP (57) ABSTRACT

Methods and systems are provided for detecting dead tunnels associated with a VPN. An indicator of a tunnel capability, for example, a DPD vendor ID, is received from a peer through a VPN connection. The tunnel capability is associated with one or more phase II tunnels associated with the VPN. Traffic generated by the peer is detected, and if traffic is detected at a tunnel, the tunnel is presumed to be alive. When no traffic is detected in a tunnel, a DPD packet exchange with the tunnel is initiated. A determination is made, based on the packet exchange, whether the tunnel is alive.

20 Claims, 7 Drawing Sheets

Related U.S. Application Data continuation of application No. 14/150,537, filed on Jan. 8, 2014, now Pat. No. 9,294,461.

(56) References Cited

U.S. PATENT DOCUMENTS

| | | |
|---|---|---|
| 9,294,461 B2 | 3/2016 | Chen |
| 9,736,048 B2 | 8/2017 | Chen |
| 2011/0066858 A1 | 3/2011 | Cheng et al. |
| 2012/0078998 A1 | 3/2012 | Son et al. |
| 2015/0195265 A1* | 7/2015 | Chen ................ H04L 63/08 726/3 |
| 2016/0254975 A1* | 9/2016 | Chen ................ H04L 63/08 709/224 |

OTHER PUBLICATIONS

U.S. Appl. No. 14/150,537 Office Action dated Apr. 23, 2015.
U.S. Appl. No. 15/077,891 Office Action dated Jul. 29, 2016.

* cited by examiner

VIRTUAL PRIVATE NETWORK DEAD PEER DETECTION

CROSS-REFERENCE TO RELATED APPLICATION

The present application is a continuation and claims the priority benefit of U.S. patent application Ser. No. 15/077,891 filed Mar. 22, 2016, now U.S. Pat. No. 9,736,048 issued on Aug. 15, 2017 which claims the priority benefit of U.S. patent application Ser. No. 14/150,537 filed Jan. 8, 2014, now U.S. Pat. No. 9,294,461 issued on Mar. 22, 2016, the disclosures of which are incorporated herein by reference.

BACKGROUND OF THE INVENTION

A virtual private network ("VPN") is a private network that uses a public wide area network ("WAN"), such as the Internet, to securely connect remote sites or users together. Internet Protocol Security ("IPsec") protocols may be used to establish mutual authentication between participants in a VPN connection, for example, between a security gateway and a peer. Participants may use the IPsec protocol suite and a two-phase Internet Key Exchange ("IKE") protocol to establish a security association ("SA") and associated tunnels for exchanging secure communications.

Current techniques for detecting a dead peer in a VPN are only applicable to phase I of the IKE protocol. Because more than one phase II tunnel may be associated with an IKE SA established in phase I, there is a need in the art for improved methods of detecting dead peers in VPN connections.

SUMMARY OF THE PRESENTLY CLAIMED INVENTION

Methods and systems are provided for detecting dead peers. In some embodiments, a method for detecting a dead peer includes receiving an indicator of a tunnel capability from a peer through a VPN connection. The tunnel capability is associated with one or more tunnels associated with the VPN. The method further includes detecting traffic generated by the peer, and initiating a packet exchange with the one or more tunnels when no traffic is detected in the one or more tunnels. The method further includes determining, based on the packet exchange, whether the one or more tunnels are alive.

In some embodiments, a system for detecting a dead peer includes a processor, a memory, and one or more modules stored in the memory and executable by the processor to receive an indicator of a tunnel capability from a peer through a VPN connection. The tunnel capability is associated with one or more tunnels associated with the VPN. The one or more modules are further executable by the processor to detect traffic generated by the peer, initiate a packet exchange with the one or more tunnels when no traffic is detected in the one or more tunnels, and determine, based on the packet exchange, whether the one or more tunnels are alive.

In some embodiments, a computer readable storage medium has embodied thereon a program, and the program is executable by a processor to perform a method for detecting a dead peer. The method includes receiving an indicator of a tunnel capability from a peer through a VPN connection. The tunnel capability is associated with one or more tunnels associated with the VPN. The method further includes detecting traffic generated by the peer, and initiating a packet exchange with the one or more tunnels when no traffic is detected in the one or more tunnels. The method further includes determining, based on the packet exchange, whether the one or more tunnels are alive.

DETAILED DESCRIPTION

Embodiments of the invention provide phase II dead peer detection (DPD) protocol for determining the aliveness of tunnels associated with a VPN. As described above, two phases of negotiation are necessary to establish IPsec tunnels. In phase I, a secure, authenticated communication channel is established using a key exchange algorithm, which results in a bi-directional IKE SA between participants. Each IKE SA may be associated with one or more IPSec tunnels, and in phase II, the peers use the secure communication channel established in phase I to negotiate SAs for the associated IPsec tunnels. As used herein, "IPsec tunnel," "phase II tunnel," and "tunnel" are used interchangeably and all refer to a tunnel associated with a VPN.

During VPN communications, a loss of connectivity may occur due to, for example, network stability or unmatched lifetime of SAs. Loss of peer connectivity may result in a "black hole" situation, where communications do not reach their destination, but instead are tunneled into an unknown void. Thus, it is necessary to quickly detect losses of peer connectivity and take appropriate corrective actions.

Current DPD protocols are able to detect the liveliness of a phase I IKE SA but cannot detect the liveliness of the associated IPsec tunnels in phase II. An IKE SA may be associated with more than one IPsec tunnel, but the current DPD protocol only queries the aliveness of the IKE SA, so one or more dead IPsec tunnels may go undetected. For example, a VPN gateway may establish one IKE SA with a peer, and the IKE SA may be associated with two IPsec tunnels. If one IPsec tunnel is dead and the other is alive, then the current DPD protocol could not detect the situation as long as the IKE SA is still alive, by virtue of the remaining alive IPsec tunnel. When the lifetime of the SA expires, the dead IPsec tunnel would need to be rekeyed, causing a gap in VPN communications. The present disclosure provides methods and systems for phase II detection of dead tunnels so as to improve VPN connectivity through early detection of losses in connectivity at the tunnel level.

Figure 1:
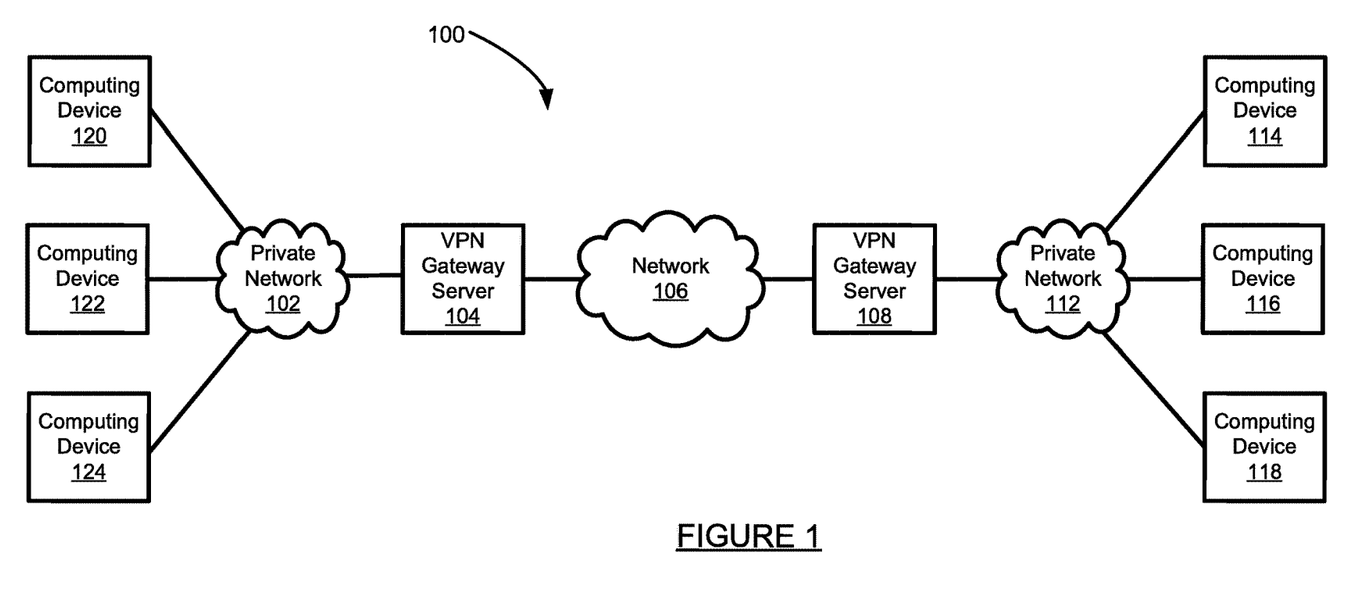
FIG. 1 is a block diagram of an exemplary VPN system.

FIG. 1 is a block diagram of an exemplary VPN system 100. VPN system 100 of FIG. 1 includes computing devices 120, 122, and 124, private network 102, VPN gateway server 104, network 106, VPN gateway server 108, private network 112, and computing devices 114, 116 and 118. VPN gateway server 104, for example, may initiate a VPN request with VPN gateway server 108. It will be understood that VPN gateway server 108 may also initiate a VPN request with VPN gateway server 104. The VPN request may include user credentials and an equipment identifier. In the example, the user identifier may be stored on VPN gateway server 104 or received via input. The equipment identifier is associated with a piece of equipment or hardware within VPN gateway server 104. VPN gateway server 108 may receive the request over network 106. An exemplary VPN gateway server, for example, VPN gateway server 108, is discussed in more detail below with respect to FIG. 2.

Network 106 may be a public network, private network, WAN, Local Area Network ("LAN"), intranet, the Internet, a mobile voice network, a mobile data network, any other suitable network, or any combination of these networks. Network 106 may send and facilitate communication between VPN gateway server 104 and VPN gateway server 108.

VPN gateway server 108 may communicate with network 106 and private network 112. VPN gateway server 104 may communicate with network 106 and private network 102. VPN gateway servers 104 and 108 may be implemented as network servers and/or application servers that communicate with the Internet. VPN gateway servers 104 and 108 may process requests for a secure VPN request. For example, VPN gateway server 108 may receive and process VPN connection requests from VPN gateway server 104.

Private networks 102 and 112 may be intranet or other private networks, for example private networks maintained by businesses. Computing devices 114, 116 and 118 may be accessible to computing devices 120, 122, and 124 through a secure VPN connection established via VPN gateway server 104 and VPN Gateway Server 108.

Figure 2:
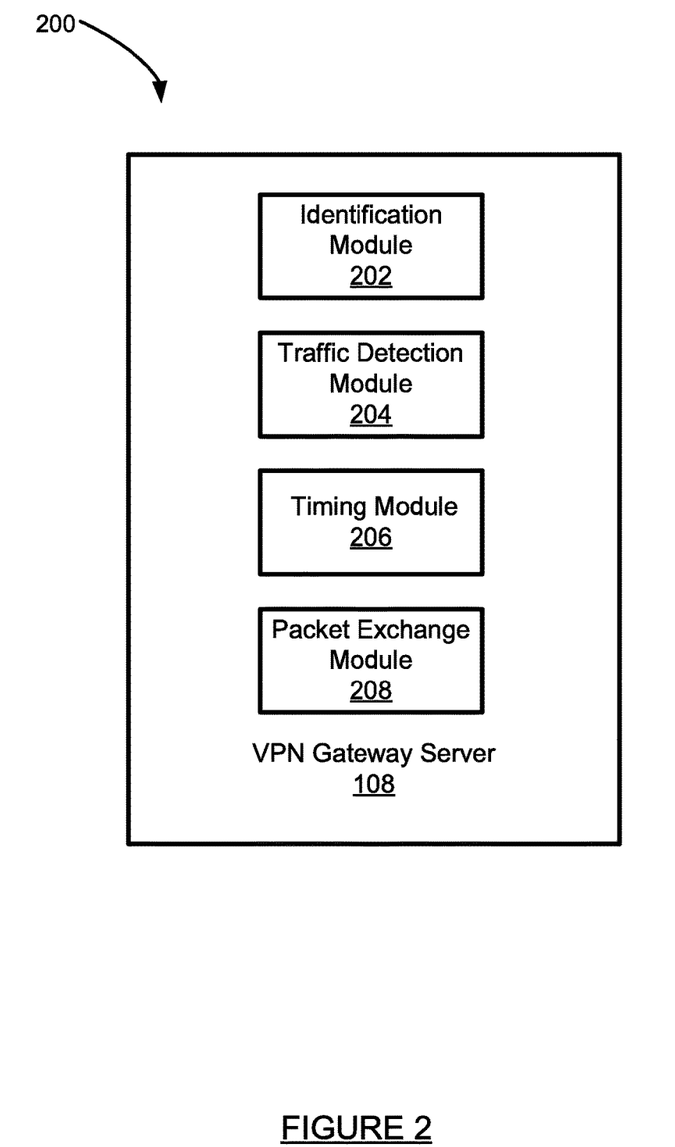
FIG. 2 is a block diagram of an exemplary VPN gateway server.

FIG. 2 is a block diagram 200 of an exemplary VPN gateway server, for example VPN gateway server 108. VPN gateway server 108 includes identification module 202, traffic detection module 204, timing module 206, and packet exchange module 208. It will be understood that VPN gateway server 108 may include any suitable modules, processes, or subsystems for implementing the features described in the present disclosure. VPN system 100, including VPN gateway server 108 and its modules, processes, or subsystems, and any other hardware or software, or both, for implementing the features described in the present disclosure may be collectively referred to, herein, as "the system."

In some embodiments, identification module 202 may determine whether or not a peer has tunnel capability based on whether the identification module 202 has received a unique identifier from the peer indicating tunnel capability. In some embodiments, the system only continues with the phase II DPD protocol if a peer has sent an identifier indicative of tunnel capability. Traffic detection module 204 may detect network traffic associated with one more tunnels associated with the VPN. In some embodiments, the system may detect traffic from one or more tunnels and presume these one or more tunnels are alive. Timing module 206 maintains a timer for each IPsec tunnel such that the timers are started when phase II negotiation is complete (i.e., IPsec SAs are established for the tunnels). Timing module 206 may restart a timer for a particular tunnel when traffic is detected at the tunnel by traffic detection module 204. In some embodiments, when the timer expires (i.e., exceeds a threshold) before traffic is detected at a tunnel, timing module 206 notifies packet exchange module 208, which initiates a packet exchange with the inactive tunnel. In some embodiments, packet exchange module 208 sends/receives a DPD packet, which includes pre-defined identification fields for an IPsec tunnel participating in the phase II DPD packet exchange. VPN gateway server 108 may detect dead peers (i.e., dead IPsec tunnels) based on the DPD packet exchange. It will be understood that FIG. 2 is described above in the context of VPN gateway server 108 of FIG. 1 for purposes of clarity and brevity and not by way of limitation. The exemplary VPN gateway server of FIG. 2 may also correspond to VPN gateway server 104 of FIG. 1. As described above, encryption of FIGS. 3-6 provide illustrative steps for performing phase II DPD packet exchanges to determine whether tunnels associated with the VPN are alive.

Figure 3:
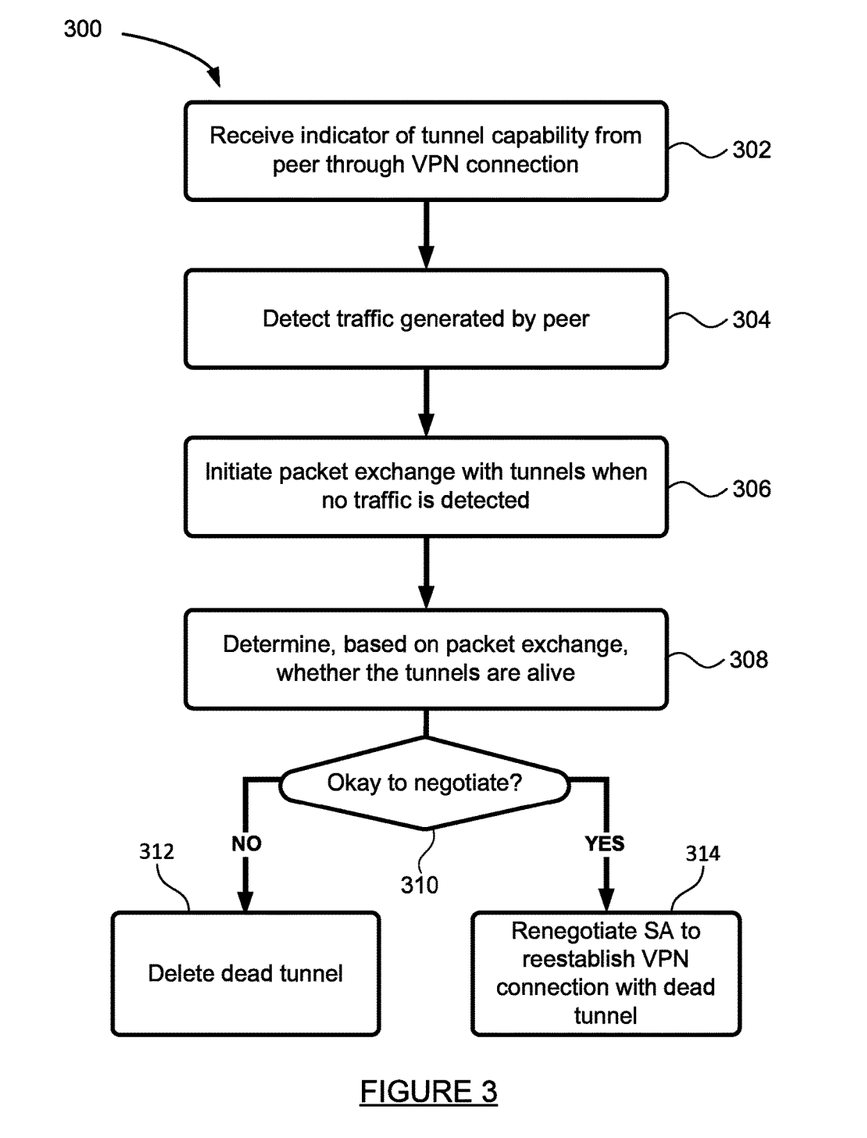
FIG. 3 is a flow diagram of illustrative steps for phase II detection of a dead peer through a VPN connection.

FIG. 3 is a flow diagram 300 of illustrative steps for phase II detection of a dead peer through a VPN connection.

At step 302, the system receives an indicator of tunnel capability from a peer through a VPN connection. As described above, two phases of negotiation are necessary in order to establish an IPsec tunnel. In phase I negotiation, a secure channel for communication between participants (i.e., IKE SA) is established using a key exchange algorithm. In some embodiments, the system receives an indication of tunnel capability in the phase I negotiation. In other words, the system may use the phase I negotiation to determine whether the peer supports phase II negotiation. In some embodiments, the indicator of tunnel capability received by the system at step 302 is indicative of phase II DPD capability. The indicator of tunnel capability may be a DPD vendor identifier (ID). In some embodiments, step 302 is implemented by identification module 202 of FIG. 2.

Figure 4:
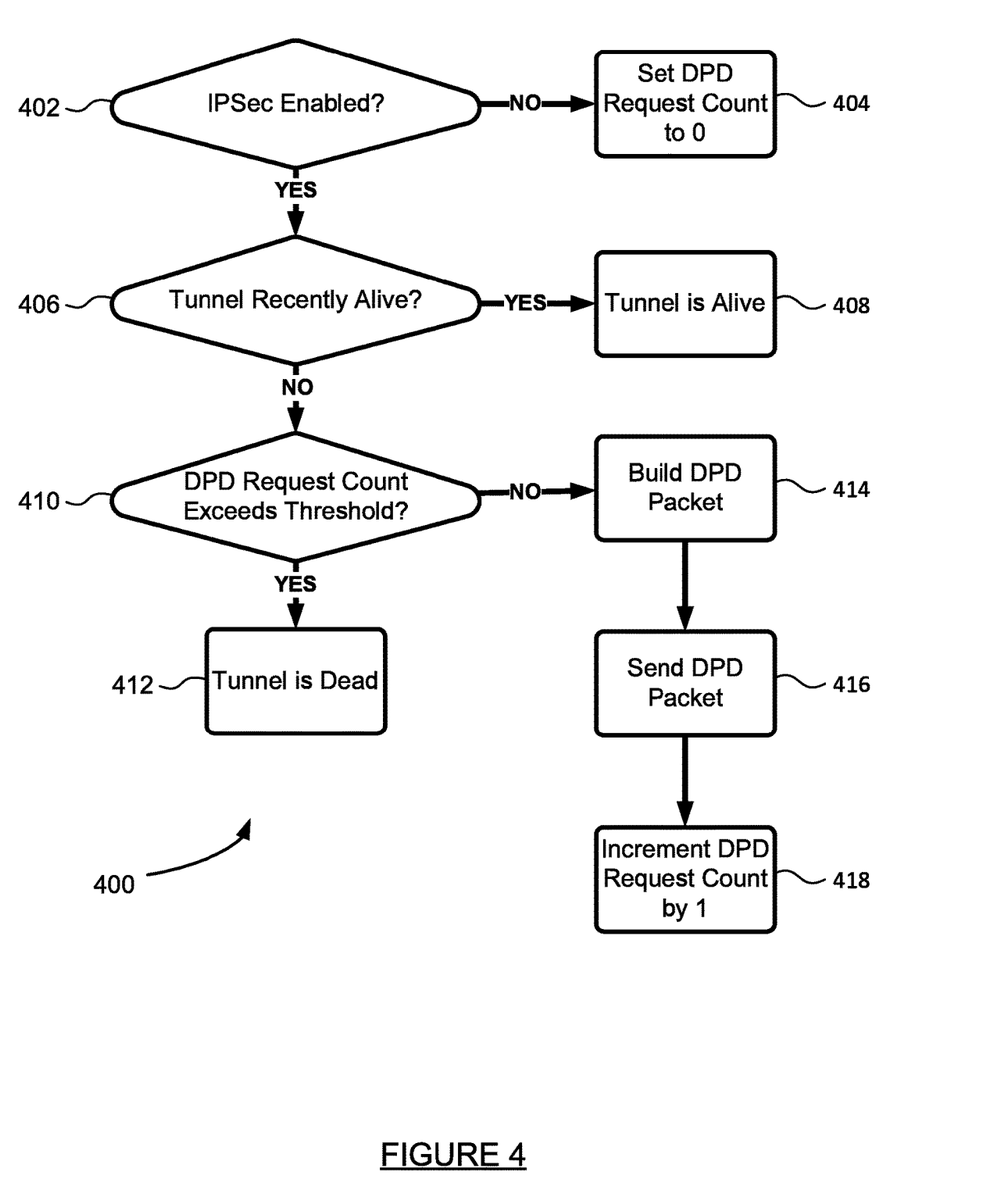
FIG. 4 is a flow diagram of illustrative steps for sending a DPD packet to one or more tunnels associated with a VPN.
Figure 5:
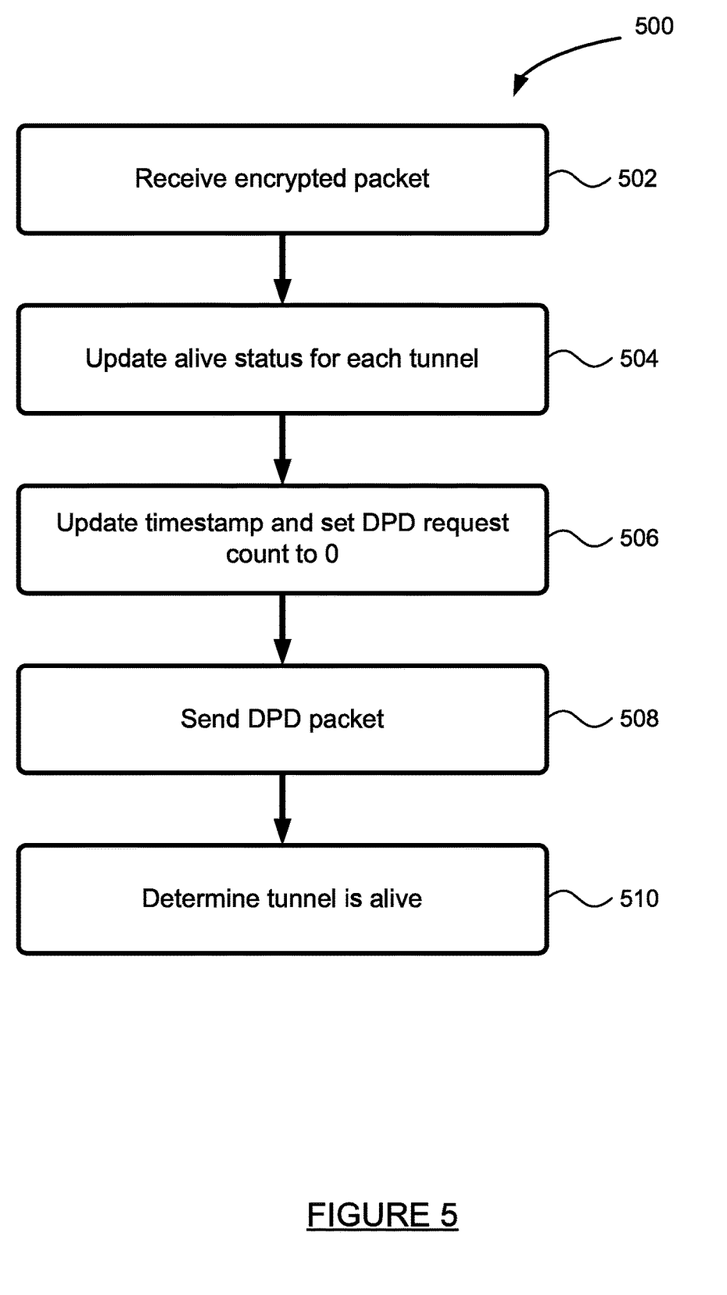
FIG. 5 is a flow diagram of illustrative steps for replying to a received DPD packet at one or more tunnels associated with a VPN.

At step 304, the system detects traffic generated by the peer. The system may detect traffic generated by the peer at phase II tunnels within the VPN connection. In some embodiments, step 302 is implemented by traffic detection module 204 of FIG. 2. At step 306, the system initiates a packet exchange with one or more tunnels associated with the VPN when no traffic is detected in step 304. In order for the packet exchange to be initiated with a peer, a peer must send an indication of tunnel capability (e.g., DPD vendor ID), as described above in connection with step 302. In some embodiments, step 304 is implemented by packet exchange module 208 of FIG. 2. Some embodiments of step 304 are further discussed in connection with FIGS. 4-5. FIGS. 4-5 show illustrative steps for conducting a packet exchange with one or more tunnels associated with a VPN.

FIG. 4 is a flow diagram 400 of illustrative steps for sending a DPD packet to one or more tunnels associated with a VPN. In some embodiments, the steps of FIG. 4 may be implemented by packet exchange module 208 of FIG. 2. At step 402, the system determines if the IPsec tunnels have been established for a peer (i.e., IPsec enabled). If the IPsec tunnels have not been established, the system sets a DPD request count to 0 at step 404. The system may maintain a running count of the number of DPD packets (i.e., DPD requests) sent to an IPsec tunnel. If the IPsec tunnels have been established for the peer, the system determines whether an IPsec tunnel was recently alive at step 406. In some embodiments, the system determines whether or not a tunnel was recently alive based on a timer associated with the tunnel, for example, a timer discussed in connection with the timing module 206 of FIG. 2. If traffic is detected in the tunnel within a predetermined period of time (i.e., timer has not expired), the system will determine the tunnel is alive at step 408.

If traffic is not detected in the tunnel within the predetermined period of time (i.e., the timer expires), then the system proceeds to step 410 and determines whether the DPD request count exceeds a threshold value. In some embodiments, the threshold value is a maximum number of DPD requests. For example, the threshold may be 3 DPD packet requests. In some embodiments, the threshold value may be between 3 and 10 DPD packet requests. At step 412, the system determines the tunnel is dead if the DPD request count exceeds the threshold. If the DPD request count does not exceed the threshold, the system will proceed to steps 414-420 to build and send a DPD request.

At step 414, the system builds a DPD packet. In some embodiments, the DPD packet may use an Internet Control Message Protocol (ICMP) echo request/reply message and include predefined fields that identify the tunnel. For example, the DPD packet may include the tunnel's security parameter index (SPI). In some embodiments, the system selects the source/destination Internet Protocol (IP) address of the ICMP from the source range/destination range of the tunnel. At step 416, the system sends the DPD packet built in step 414. At step 420, the system increments the DPD request count by 1 to reflect the sent DPD packet in step 418. After a DPD packet is sent in step 418, it may be received as an encrypted packet at an IPsec tunnel associated with the VPN, as described below in FIG. 5.

FIG. 5 is a flow diagram 500 of illustrative steps for replying to a received DPD packet at one or more tunnels associated with a VPN. In some embodiments, the steps of FIG. 5 may be implemented by packet exchange module 208 of FIG. 2. At step 502, an encrypted packet is received at an IPsec tunnel. In some embodiments, the packet may be encrypted using a security protocol, for example an encapsulating security payload (ESP) or an authentication header (AH) security protocol. At step 504, the system updates the tunnel alive status and consequently the peer alive status. At step 506, the system updates the timestamp and sets the DPD request count to 0. In some embodiments, the timestamp may indicate the time at which the DPD packet was received. At step 508, the system sends a DPD reply packet, and the system determines the respective tunnel is alive after receipt of the DPD reply packet at step 510.

Referring back to FIG. 3, at step 308, the system determines, based on the packet exchange, whether the tunnels are alive. In some embodiments, the system determines a tunnel is dead after a predetermined number of packet exchanges fail. For example, the system may determine a tunnel is dead when the DPD request count is 3.

At step 310, the system determines whether it is okay to start a new negotiation with a peer when it is determined that a tunnel is dead. The system may make this determination based on whether or not the peer with which it wishes to negotiate grants permission. At step 312, the system deletes the dead tunnel when it is determined that it is not okay to negotiate. At step 314, the system renegotiates an SA with the peer to reestablish a VPN connection with the dead tunnel.

Figure 6:
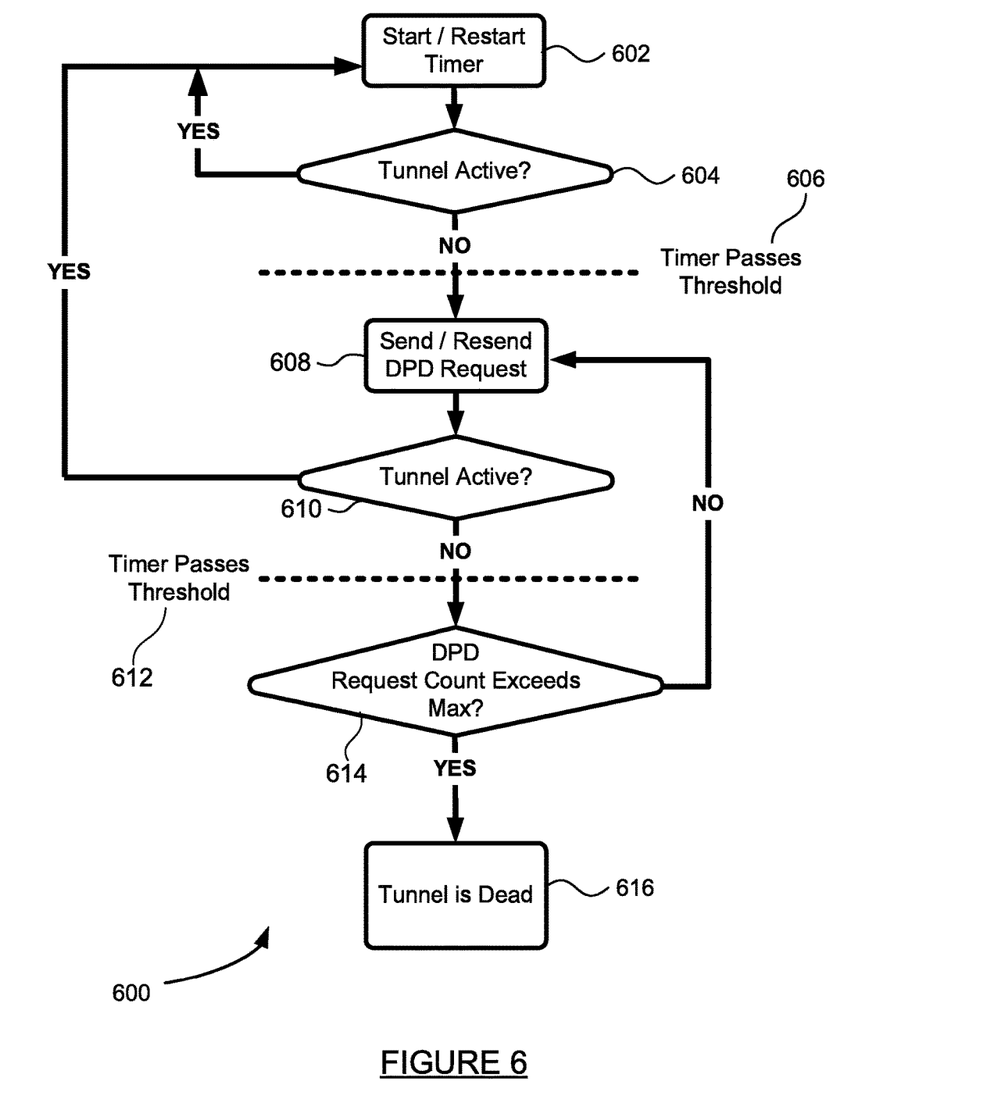
FIG. 6 is a flow diagram of illustrative steps for phase II detection of a dead peer through a VPN connection.

FIG. 6 is a flow diagram 600 of illustrative steps for phase II detection of a dead peer through a VPN connection. In some embodiments, the steps of FIG. 6 may be implemented by timing module 206 of FIG. 2. At step 602, the system starts the timer when the phase II negotiation of IPsec tunnels is complete. At step 604, the system determines whether the tunnel is active. The system may determine a tunnel is active if VPN traffic is detected and/or a peer query is received. If the tunnel is determined to be active, the system returns to step 602, the tunnel is determined to be active, the timer is restarted, and the preceding steps of flow diagram 600 are repeated. If the tunnel does not exhibit any action before the timer passes a predetermined timer threshold at step 606, the tunnel is determined to be inactive, and then the system will send a DPD packet request at step 608. In some embodiments, the timer threshold is a value between 120 and 600 seconds. For example, the timer threshold may be 180 seconds.

In some embodiments, the timer may restart after it passes the threshold in step 606. Thus, at step 610, the system again determines whether a tunnel is active before the timer passes a threshold, shown as step 612. The threshold passed in step 612 may be the same as described above in connection with step 606. At step 610, the system may determine the tunnel is active if VPN traffic is detected, a peer query is received, and/or a response to the DPD packet is received. If the peer is determined to be active, the system returns to step 602, the tunnel is determined to be active, the timer is restarted, and the preceding steps of flow diagram 600 are repeated.

After the timer has expired in step 612, the system determines whether the DPD request count exceeds the maximum allowed number of DPD requests. In other words, the system may determine whether the number of failed packet exchanges with a tunnel exceeds or is equal to a predetermined number. Step 612 may correspond to step 410 of FIG. 4. If it is determined that the system has exceeded the maximum number of DPD requests, the system will determine the tunnel is dead at step 616, and the method may proceed to step 310 of FIG. 3 (not illustrated in FIG. 6), to determine whether the system should delete the dead tunnel, as described in step 312, or renegotiate an SA with the peer to reestablish a VPN connection with the dead tunnel, as described in step 314.

Figure 7:
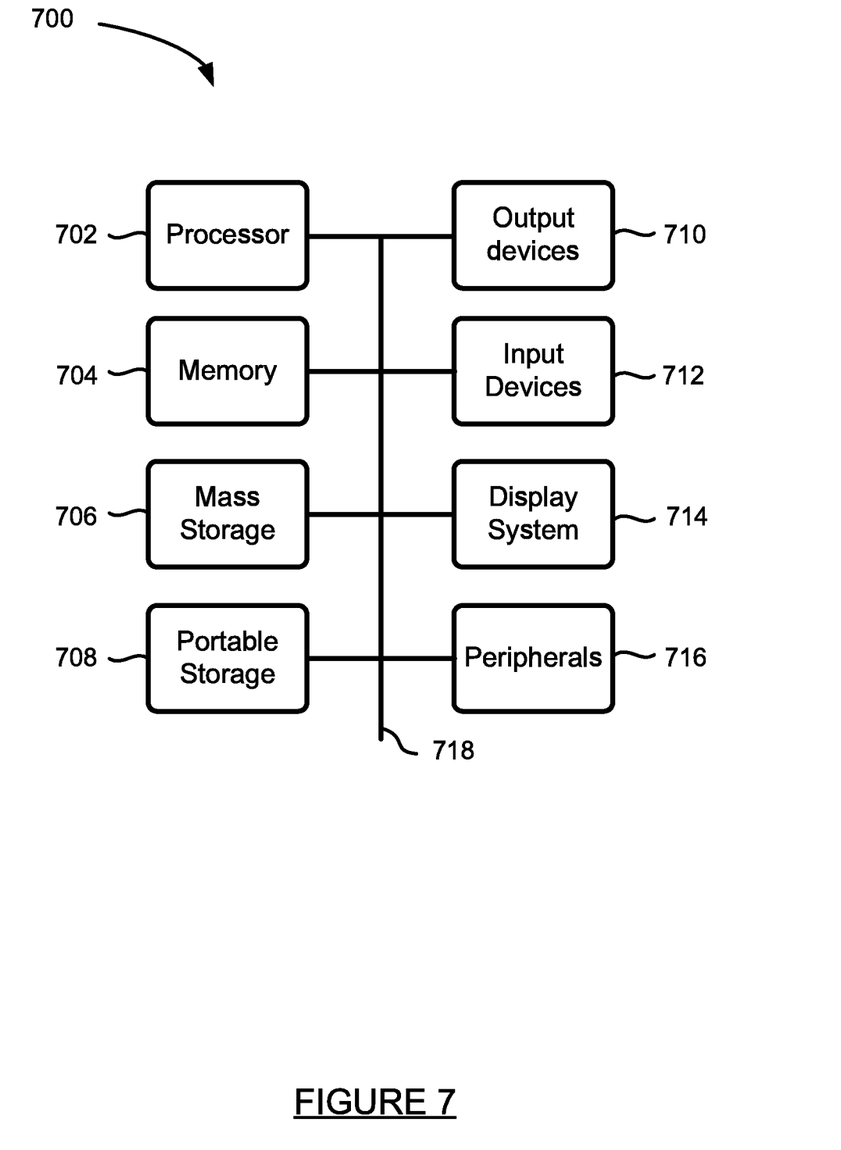
FIG. 7 is a block diagram of an exemplary computing environment in accordance with some implementations of the present disclosure.

FIG. 7 is a block diagram of an exemplary computing system 700 for implementing the present technology. Computing system 700 of FIG. 7 may be implemented, for example, in the contexts of computing devices 120, 122, and 124, private network 102, VPN gateway server 104, network 106, VPN gateway server 108, private network 112, and computing devices 114, 116, and 118. Computing system 700 includes one or more processors 702 and memory 704. Main memory 704 stores, in part, instructions and data for execution by processor 702. Main memory 704 may store executable code when in operation. Computing system 700 of FIG. 7 further includes a mass storage device 706, portable storage medium drive(s) 708, output devices 710, user input devices 712, a graphics display 714, and peripheral devices 716.

For purposes of brevity and clarity, and not by way of limitation, the components of computing system 700 are depicted in FIG. 7 as being connected via a single bus 718. It will be understood, however, that the components may be connected through one or more data transport means. For example, processor unit 702 and main memory 704 may be connected via a local microprocessor bus, and the mass storage device 706, peripheral device(s) 716, portable storage device 708, and display system 714 may be connected via one or more input/output (I/O) buses.

Mass storage device 706, which may be implemented with a magnetic disk drive or an optical disk drive, is a non-volatile storage device for storing data and instructions for use by processor 702. Mass storage device 706 can store the system software for implementing embodiments of the present invention for purposes of loading that software into main memory 704.

Portable storage device 708 operates in conjunction with a portable non-volatile storage medium, such as a floppy disk, compact disk or Digital video disc, to input and output data and code to and from the computer system 700 of FIG. 7. The software for implementing embodiments of the present invention may be stored on such a portable medium and input to the computer system 700 via the portable storage device 708.

Input devices 712 provide a portion of a user interface. Input devices 712 may include an alphanumeric keypad, such as a keyboard, for inputting alphanumeric and other information, a pointing device, such as a mouse, a trackball, stylus, cursor direction keys, a touchscreen, a touchscreen including a virtual keyboard, or any other suitable input devices. Computing system 700 additionally includes output devices 710. Output devices 710 may include any suitable output devices, for example, speakers, printers, network interfaces, and monitors.

Display system 714 may include a liquid crystal display (LCD), light emitting diode (LED) display, plasma display, or other suitable display device. Display system 714 receives textual and graphical information, and processes the information for output to the display device.

Peripherals 716 may include any type of computer support device to add additional functionality to the computer system. For example, peripheral device(s) 716 may include a modem or a router.

The components contained in computing system 700 of FIG. 7 are those typically found in computer systems that may be suitable for use with embodiments of the present invention and are intended to represent a broad category of such computer components that are well known in the art. Computing system 700 of FIG. 7 may be a personal computer, hand held computing device, telephone, mobile computing device, workstation, server, minicomputer, mainframe computer, or any other computing device. Computing system 700 may also include different bus configurations, networked platforms, multi-processor platforms, any other suitable components, or any combination thereof. Computing system 700 may use any suitable operating system, including, for example, Unix, Linux, Windows, Macintosh Operating System (OS), Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teachings. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for detecting dead tunnels, the method comprising:
    receiving an indicator of a tunnel capability from a peer device through a Virtual Private Network (VPN) connection identifying that a plurality of phase II tunnels is allowed to be established with the peer device;
    establishing a first phase II tunnel and a second phase II tunnel with the peer device within the VPN connection;
    detecting traffic generated by the peer device over the first phase II tunnel and the second phase II tunnel;
    initiating a packet exchange over the first phase II tunnel when no traffic is detected in the first phase II tunnel; and
    identifying that the first phase II tunnel is alive based on the packet exchange.

2. The method of claim 1, further comprising:
    detecting the traffic generated by the peer device over the first phase II tunnel and the second phase II tunnel;
    initiating a packet exchange over the first phase II tunnel when no traffic is detected in the first phase II tunnel; and
    identifying that the first phase II tunnel is dead based on the packet exchange.

3. The method of claim 1, wherein the indicator includes a dead peer detection (DPD) vendor identifier, and wherein the DPD vendor identifier is indicative of phase II DPD capability.

4. The method of claim 3, wherein the VPN connection is associated with the plurality of phase II tunnels.

5. The method of claim 3, wherein the packet exchange is a phase II DPD packet exchange.

6. The method of claim 1, further comprising:
    starting a first timer when a VPN connection is established with the first phase II tunnel; and
    restarting the first timer when traffic is detected in the first phase II tunnel.

7. The method of claim 6, further comprising initiating the packet exchange when the first tinier expires.

8. The method of claim 2, wherein the first tunnel is identified to be dead after identifying that a predetermined number of packet exchanges over the first phase II tunnel has failed.

9. The method of claim 8, further comprising renegotiating a security association with the peer to reestablish a VPN connection with the first phase II tunnel after identifying that the first phase II tunnel is dead.

10. The method of claim 2, further comprising deleting the first phase II tunnel after identifying that the first tunnel is dead.

11. An apparatus for detecting dead tunnels, the apparatus comprising:
    a hardware network communication interface that:
        receives an indicator of a tunnel capability from a peer device through a Virtual Private Network (VPN) connection identifying that a plurality of phase II tunnels is allowed to be established with the peer device, and
        establishes a first phase II tunnel and a second phase II tunnel with the peer device within the VPN connection; and
    a hardware processor that executes one or more modules stored in memory, wherein the hardware processor executes the modules to:
        detect traffic generated by the peer device over the first phase II tunnel and the second phase II tunnel;
        initiate a packet exchange over the first phase II tunnel when no traffic is detected in the first phase II tunnel; and
        identify that the first phase II tunnel is alive based on the packet exchange.

12. The apparatus of claim 11, wherein the hardware processor executes further instructions to:
    detect the traffic generated by the peer device over the first phase II tunnel and the second phase II tunnel;
    initiate a packet exchange over the first phase II tunnel when no traffic is detected in the first phase II tunnel; and
    identify that the first phase II tunnel is dead based on the packet exchange.

13. The apparatus of claim 11, wherein the indicator includes a dead peer detection (DPD) vendor identifier, and wherein the DPD vendor identifier is indicative of phase II DPD capability.

14. The apparatus of claim 13, wherein the packet exchange is a phase II DPD packet exchange.

15. The apparatus of claim 11, wherein the hardware processor executes further instructions to:
   start a first timer when a VPN connection is established with the first phase II tunnel; and
   restart the first timer when traffic is detected in the first phase II tunnel.

16. The apparatus of claim 15, further comprising initiating the packet exchange when the first timer expires.

17. The apparatus of claim 12, wherein the first tunnel is identified to be dead after identifying that a predetermined number of packet exchanges over the first phase II tunnel has failed.

18. The apparatus of claim 17, wherein the hardware processor executes further instructions to renegotiate a security association with the peer to reestablish a VPN connection with the first phase II tunnel after identifying that the first phase II tunnel is dead.

19. The apparatus of claim 12, wherein the first phase II tunnel is deleted after identifying that the first tunnel is dead.

20. A non-transitory computer-readable storage medium, having embodied thereon a program executable by a processor to perform a method for detecting dead tunnels, the method comprising:
   receiving an indicator of a tunnel capability from a peer device through a Virtual Private Network (VPN) connection identifying that a plurality of phase II tunnels is allowed to be established with the peer device;
   establishing a first phase II tunnel and a second phase II tunnel with the peer device within the VPN connection;
   detecting traffic generated by the peer device over the first phase II tunnel and the second phase II tunnel;
   initiating a packet exchange over the first phase II tunnel when no traffic is detected in the first phase II tunnel; and
   identifying that the first phase II tunnel is alive based on the packet exchange.

* * * * *